UNITED STATES PATENT OFFICE.

JAMES ROBERT GARROWAY, OF GLASGOW, SCOTLAND.

PROCESS OF PURIFYING PYROLIGNEOUS ACID.

No. 844,860.        Specification of Letters Patent.        Patented Feb. 19, 1907.

Application filed October 6, 1905. Serial No. 281,704.

*To all whom it may concern:*

Be it known that I, JAMES ROBERT GARROWAY, 694 Duke street, Glasgow, Scotland, manufacturing chemist, have invented a certain new and useful Process of Purifying Pyroligneous Acid, of which the following is a specification.

This invention relates to improvements in the manufacture of acetic acid, acetic-acid salts, and by-products resulting from such manufacture, and has for its object the provision of a process whereby relatively purer and better compounds of acetic acid as well as the acid itself may be produced at less expense of time and labor, a higher yield of acetic acid and its salts and the by-products incidental to the manufacture of these may be secured, and an easier and more thorough elimination of contaminating materials naturally coexistent with acetic acid in its commercial source may be made possible.

To this end it is proposed to neutralize crude pyroligneous acid—the commercial source of acetic acid—with a magnesium compound possessing the ability to displace the replaceable hydrogen of acids, to eliminate contaminating material, to treat the now partially-purified acetic-acid compound of magnesia with a powerful mineral acid chosen with especial reference to its ability to form stable and readily-soluble salts of magnesium as well as to liberate acetic acid from magnesium acetate, and to recover the liberated and volatile acetic acid and the mineral-acid magnesium salt by suitable manipulation and technique adapted for such recovery.

Hitherto it has been the practice to neutralize pyroligneous acid with either lime or sodium carbonate, calcium or sodium acetate resulting therefrom. In my improved process I substitute for such neutralizing agents material or materials which perform the neutralizing action in a better manner and yield acetic-acid salts more readily soluble than are either calcium or sodium acetate.

Dependent upon the particular color of acetic-acid salt desired, pyroligneous acid is either distilled, after the tar has been allowed to settle, or at once neutralized. If a preliminary distilling process is employed, a gray salt of acetic acid results. Direct neutralization—that is, neutralization without a preliminary distillation—yields a brown acetic-acid salt. For the production of gray salt I employ oxid of magnesium as neutralizing agent. For producing brown salt I employ carbonate of magnesia. In either case acetate of magnesium results, and because such salt is readily soluble in water it is possible to "boil in" or concentrate such magnesium-acetate solution to a markedly heavy density, an easy and thorough elimination of tar being made possible hereby. In this respect my invention is unlike that of previous processes in which lime or sodium carbonate were employed. The solution of magnesium acetate being sufficiently concentrated, sulfuric acid of proper strength and in quantities sufficient to decompose all of the magnesium acetate—that is, to liberate all of the acetic acid combined with magnesium—is added and the entire material subjected to distillation, whereby acetic acid is readily given off while sulfate of magnesia remains in the still.

An alternative process for the herein-described manipulation of the decomposed magnesium-acetate solution—that is, what is now a solution of magnesium sulfate and free acetic acid—is its further concentration with subsequent crystallization of the sulfate of magnesium from such mother-liquor. The removal of these crystals of magnesium sulfate is variously effected by means of suitable presses or centrifugal machines known for such separatory manipulation, the mother-liquor being after such separation subjected to the distillation previously described.

Acetic acid of high purity results from either of the described equivalent separatory manipulations while the magnesium sulfate is still in a crude state because of contamination with tar. For purification this material is heated to a high temperature in a suitable furnace, the tar being removed hereby by volatilization and burning. The residuum of crude magnesium sulfate is further purified by repeated crystallizations, commercial Epsom salts resulting.

What I claim, and desire to secure by Letters Patent, is—

1. The herein-described process for producing acetic acid, and by-products from crude pyroligneous acid, consisting in neutralizing the acid with a basic magnesium compound, concentrating the neutralized solution, removing contaminating materials, saturating the purified solution with a mineral acid and separating the volatile from the non-volatile portions.

2. The herein-described process for producing acetic acid, and by-products from crude pyroligneous acid, consisting in neutralizing the acid with magnesium oxid, concentrating the neutralized solution, removing contaminating materials, saturating with a mineral acid, and separating the resulting acetic acid from the magnesium salt produced.

3. The herein-described process for producing acetic acid, and by-products from crude pyroligneous acid, consisting in neutralizing the acid with magnesium oxid, concentrating the neutralized solution, removing contaminating materials, saturating with sulfuric acid and separating the acetic acid from the magnesium sulfate.

In witness whereof I have hereunto set my hand in the presence of two witnesses.

JAMES ROBERT GARROWAY.

Witnesses:
JOHN LIDDLE,
CATHERINE HAMILTON.